2 Sheets—Sheet 2.

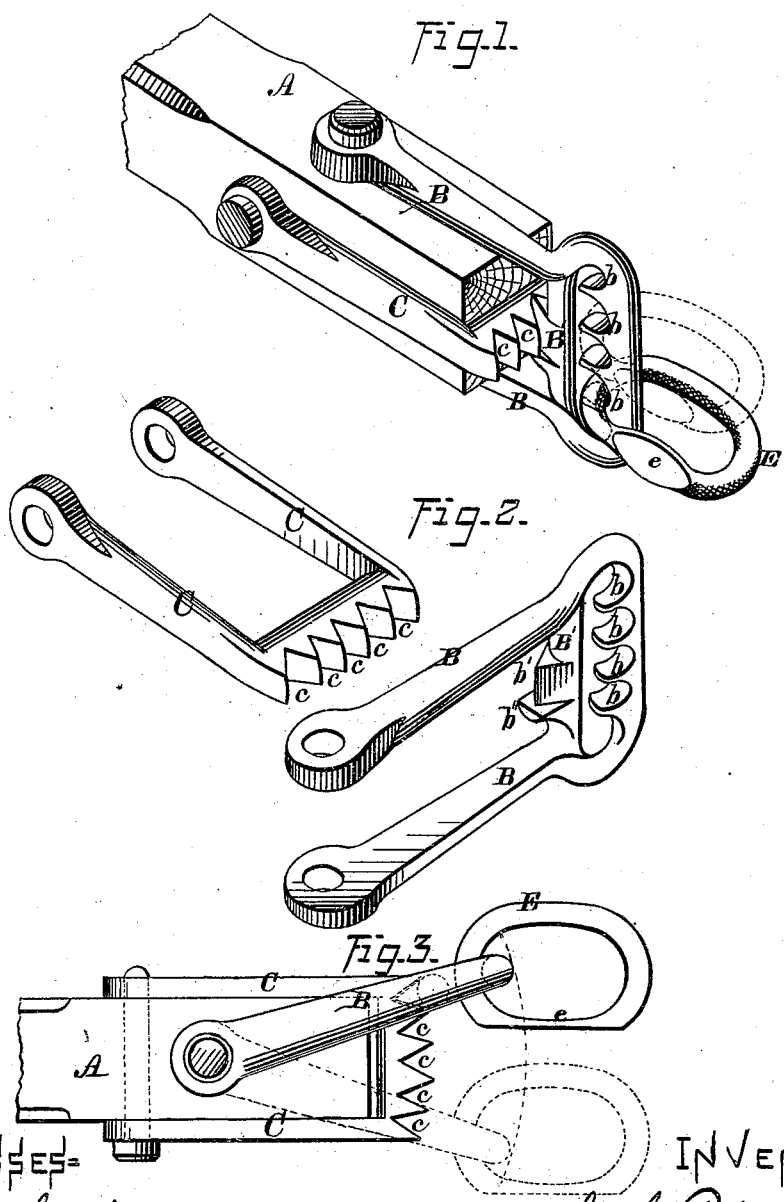

C. ROBINSON.
CLEVIS FOR PLOWS.

No. 188,413. Patented March 13, 1877.

WITNESSES:
Jas. E. Hutchinson
Henry C. Hazard

INVENTOR
Clark Robinson, by
Prindle and Russell his Attys

UNITED STATES PATENT OFFICE.

CLARK ROBINSON, OF EAU CLAIRE, WISCONSIN.

IMPROVEMENT IN CLEVISES FOR PLOWS.

Specification forming part of Letters Patent No. 188,413, dated March 13, 1877; application filed January 22, 1877.

*To all whom it may concern:*

Be it known that I, CLARK ROBINSON, of Eau Claire, in the county of Eau Claire and in the State of Wisconsin, have invented certain new and useful Improvements in Clevises for Plows; and do hereby declare that the following is a full, clear, and exact description thereof, reference being had to the accompanying drawings, making a part of this specification, in which—

Figure 4:
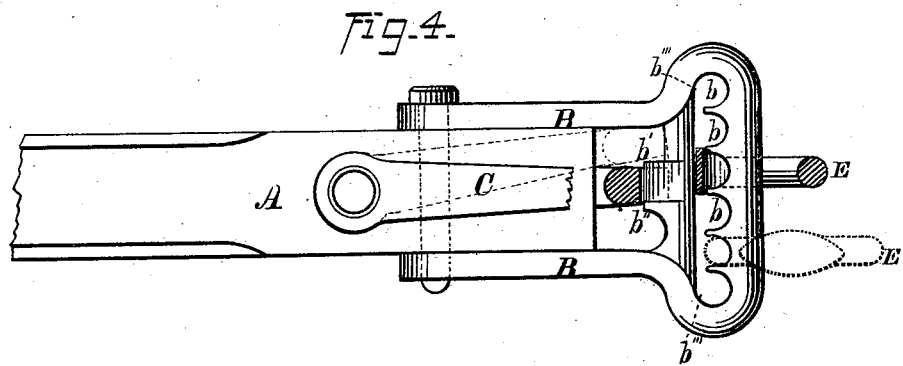
Figure 5:
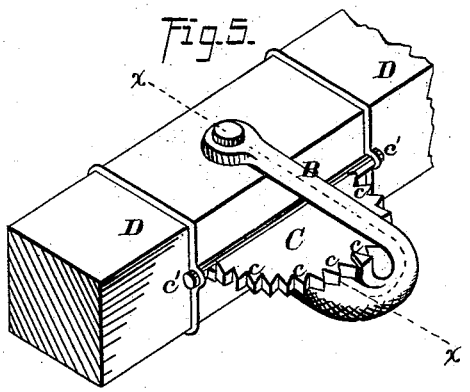
Figure 6:
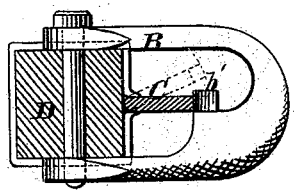

Figure 1 is a perspective view of my improved clevis in place upon a plow-beam. Fig. 2 is a like view of the same detached from said beam. Fig. 3 is a plan view of the upper side of said parts as combined. Fig. 4 is a side elevation of the same, a portion of the horizontal clevis or lock being broken away. Fig. 5 is a perspective view of my improvement as applied to a double whiffletree, and Fig. 6 is a section of the same upon line $x \, x$ of Fig. 5.

Letters of like name and kind refer to like parts in each of the figures.

The design of my invention is, mainly, to enable the depth and side draft of a plow to be easily and quickly regulated; and to this end it consists, principally, in the means employed for locking the clevis in lateral position, substantially as and for the purpose hereinafter specified.

It consists, further, in the peculiar construction and arrangement of the forward end of the clevis and the ring which engages therewith, substantially as and for the purpose hereinafter shown.

In the annexed drawings, A represents the forward end of a plow-beam, to or upon which is pivoted a clevis, B, that has the form shown in Fig. 2, its outer end being provided with a series of horizontal notches, $b$, upon the inner side of the bar which forms said end. A vertical bar, B', extending between the horizontal portions of said clevis, at a short distance in rear of its notched end, has a plain front side, but at its rear side is provided with a $\wedge$-shaped spur, $b'$, which extends rearward, and at its lower side terminates in a horizontal shoulder, $b''$. Upon the sides of the beam A is pivoted a second clevis, C, which passes around the end of the same in rear of the cross-bar B', and upon the forward edge of the bar that forms its front end is provided with a series of $\vee$-shaped notches, $c$, which correspond to and may be passed over the spur $b'$ of the clevis B, as shown in Fig. 1.

When the clevis C is engaged with the spur $b'$ its outer end rests upon and is supported by the shoulder $b''$, in which position said clevis acts as a lock for the clevis B, and holds the latter firmly in lateral position.

When it is desired to change the lateral position of said clevis B the outer end of said clevis or lock C is raised until disengaged from said spur $b'$; said clevis B is then turned to the right or left, and said lock permitted to drop into engagement once more.

For use in connection with double whiffletrees, the locking-plate C is provided with laterally-projecting pintles $c'$, which are suitably journaled upon the front side of the bar D, so as to enable said plate C to be turned upward, as shown by the dotted lines of Fig. 6.

The clevis B may have the form before described, or may be constructed as shown in Figs. 5 and 6, the spur $b''$ being the same in each case, and the operations of parts identical.

Within the space in front of the cross-bar B' is placed a ring or link, E, which is preferably constructed from round iron, that has such transverse dimensions as to cause it to fill loosely the space $b'''$ between the front side of one of the notches $b$ and the front side of said bar B'.

In order that the link E may be changed from one of the notches $b$ to the notch above or below the same, one side of said link is flattened, and such flattened part $e$ given such transverse dimensions as will enable it to pass through the space between the front side of the cross-bar B' and the rear side of the notched bar.

To move the link E to an upper or a lower notch, it is necessary to place said link in a position which it could never assume otherwise, so that no liability exists for its accidental displacement.

Having thus fully set forth the nature and merits of my invention, what I claim as new is—

1. In combination with the clevis B, provided with the spur $b'$ and shoulder $b''$, the locking-plate C, having a toothed front edge, pivoted upon the bar A, and capable of vertical motion, so as to enable its notches $c$ to engage or be released from engagement with said spur, substantially as and for the purpose specified.

2. In combination with the clevis B, provided at its front end with a vertical space, $b'''$, which has at its front side notches $b$, the link E arranged to loosely fill one of said notches, and provided with a horizontally-flattened portion, $e$, that is capable of passing through said space $b'''$, substantially as and for the purpose shown.

In testimony that I claim the foregoing I have hereunto set my hand this 29th day of November, 1876.

CLARK ROBINSON.

Witnesses:
J. F. ELLIS,
J. W. WHELAN.